United States Patent
Maddalozzo, Jr. et al.

[11] Patent Number: 5,978,848
[45] Date of Patent: Nov. 2, 1999

[54] WEB BROWSER METHOD AND SYSTEM FOR BACKGROUNDING A LINK ACCESS DURING SLOW LINK ACCESS TIME PERIODS

[75] Inventors: John Maddalozzo, Jr.; Gerald Francis McBrearty; Johnny Meng-Han Shieh, all of Austin, Tex.

[73] Assignee: International Business Machines Corporation, Armonk, N.Y.

[21] Appl. No.: 08/818,481

[22] Filed: Mar. 14, 1997

[51] Int. Cl.[6] .................................................. G06F 13/00
[52] U.S. Cl. .......................... 709/227; 709/200; 709/203; 709/217; 709/219; 709/227; 709/228; 709/229; 709/232; 707/10; 707/100
[58] Field of Search .................................... 709/200, 203, 709/217, 218, 219, 227, 228, 232; 707/10, 100; 340/825.06, 825.07, 825.08

[56] References Cited

U.S. PATENT DOCUMENTS

| | | | |
|---|---|---|---|
| 4,827,508 | 5/1989 | Shear | 380/4 |
| 4,953,209 | 8/1990 | Ryder, Sr. et al. | 380/23 |
| 5,515,490 | 5/1996 | Buchanan et al. | 395/807 |
| 5,572,643 | 11/1996 | Judson | 395/793 |
| 5,657,450 | 8/1997 | Rao et al. | 709/217 |
| 5,737,619 | 4/1998 | Judson | 395/761 |
| 5,742,762 | 4/1998 | Scholl et al. | 395/200.3 |
| 5,778,372 | 7/1998 | Cordell et al. | 709/218 |

OTHER PUBLICATIONS

Mark R. Brown, Special Edition, Using Netscape 2, QUE, 1995.

*Primary Examiner*—Frank J. Asta
*Assistant Examiner*—William C. Vaughn, Jr.
*Attorney, Agent, or Firm*—Leslie A. Van Leeuwen; Andrew J. Dillon

[57] ABSTRACT

A browser background extension method and system for a Web browser such that a link access can be backgrounded during slow link access time periods in a computer network having a client connectable to one or more servers, the client having an interface for displaying a first hypertext document with a hypertext link to a second hypertext document located at a server. Initially, an access parameter is associated with the hypertext link. Next, the hypertext link to the second hypertext document is selected, in response to user input. Thereafter, an access time period is invoked in an active mode of a Web browser such that the hypertext link accesses the second hypertext document in response to the selection. Next, if the access time period proceeds at a rate of access slower than a desired rate of access, the link access is terminated in the active mode of the Web browser and continues thereafter in a background mode on a scheduled or opportunistic basis, in response to a subsequent user input.

11 Claims, 5 Drawing Sheets

WEB BROWSER METHOD AND SYSTEM FOR BACKGROUNDING A LINK ACCESS DURING SLOW LINK ACCESS TIME PERIODS

CROSS-REFERENCE TO RELATED APPLICATIONS

The present invention is related to co-pending applications, Ser. No. 08/818,485, IBM Docket No. AT9-96-332, assigned to the assignee herein named and filed of even date herewith.

BACKGROUND OF THE INVENTION

1. Technical Field

The present invention relates to information retrieval in data-processing systems. In particular, the present invention relates to data-processing systems which are linked to other data-processing systems by an associated linking network. More particularly, the present invention relates to associated networks which utilize mark-up languages. Still more particularly, the present invention relates to a method and system for effectively managing server-latency difficulties. The present invention also relates to a web browser method and system for backgrounding a link access during slow link access time periods in order to allow web browser users to effectively manage attempts at obtaining particular web pages during such time periods.

2. Description of the Related Art

The development of computerized information resources, such as the "Internet" and the proliferation of "web" browsers allow users of data-processing systems to link with other servers and networks and thus retrieve vast amounts of electronic information heretofore unavailable in an electronic medium. Such electronic information is increasingly displacing more conventional means of information transmission, such as newspapers, magazines, and even television. In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers.

Electronic information transferred between data-processing networks is usually presented in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyperlink information, such as "World Wide Web" address sites, are contained within hypermedia and hypertext documents, which allow a user to go back to the "original" or referring Web site by the mere "click" (i.e., with a mouse or other pointing device) of the hyperlinked topic.

A typical networked system which utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. Thus, in a client/server architecture, particularly a networked system, a client is usually a computer that accesses shared network resources provided by another computer (i.e., a server).

In such a client/server architecture, a request by a user for news can be sent by a client application program to a server. Such a server is typically a remote computer system accessible over the Internet or other communication medium. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, and communicate with one another over a communication medium, thus providing distributed functionality and allowing multiple clients to take advantage of the information-gathering capabilities of the server.

Client and server can communicate with one another utilizing the functionality provided by Hypertext Transfer Protocol (HTTP). The World Wide Web (WWW) or, simply, the Web, includes all the servers adhering to this standard which are accessible to clients via universal resource locators. For example, communication can be provided over a communication medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to Web "pages" constructed from a Hypertext Markup Language (HTML), or other server-generated data.

The client and server typically display browsers and other Internet data for a user via a graphical user interface. A graphical user interface is a type of display format that enables a user to choose commands, start programs, and see lists of files and other options by pointing to pictorial representations (i.e., icons) and lists of menu items on the screen. Choices can generally be activated either with a keyboard or a mouse.

A World Wide Web page may have text, graphic images, and even multimedia objects such as sound recordings or moving video clips. A hypertext page, if more than just text, is usually constructed by loading several separate files, e.g., the hypertext file "main.html" might include a reference to a graphic image file "picture.gif" or to a sound file "beep.wav." When a client workstation sends a request to a server for a page, the server first transmits (at least partially) the main hypertext file associated with the page, and then loads, either sequentially or simultaneously, the other files associated with the page. A given file may be transmitted as several separate pieces via TCP/IP protocol. The constructed page is then displayed on the workstation monitor. A page may be "larger" than the physical size of the monitor screen, and techniques such as scroll bars within a graphical user interface are used by the viewing software (the Web browser) to view different portions of the page.

A common problem faced by individuals utilizing Web browsers to search the World Wide Web is the latency due to slow or unreachable Web servers. In such a situation, a user usually has no other choice but to continue attempting connection to the desired Web site via the Web browser or simply stopping the load operation during a slow link access time period when the user's patience expires. An estimation of the length of time to access such a server is not available to the individual or the Web browser software, thus potentially wasting the individual user's time. In view of the above it can be seen that a need exists for a method and system which would allow a user utilizing a Web browser to background a link access during a link access time period that is proceeding slowly or is expected to proceed slowly. Backgrounding such a link access would allow a user to specify time limits on attempts to obtain a particular Web page, remarks about that particular page, and action to take when the page is fully loaded.

SUMMARY OF THE INVENTION

It is therefore an object of the present invention to provide for information retrieval methods in data-processing systems.

It is another object of the present invention to provide methods and systems which can be utilized with data-processing systems linked to other data-processing systems by associated linking networks.

It is still another object of the present invention to provide a method and system which effectively managing server latency difficulties.

It is yet another object of the present invention to provide a Web browser method and system for backgrounding a link access during slow link access time periods in order to allow Web browser users to effectively manage attempts at obtaining particular Web pages during such time periods.

The above and other objects are achieved as is now described. A browser background extension method and system is presented for a Web browser such that a link access can be backgrounded during slow link access time periods in a computer network having a client connectable to one or more servers, the client having an interface for displaying a first hypertext document with a hypertext link to a second hypertext document located at a server. Initially, an access parameter is associated with the hypertext link. Next, the hypertext link to the second hypertext document is selected, in response to user input. Thereafter, an access time period is invoked in an active mode of a Web browser such that the hypertext link accesses the second hypertext document in response to the selection. Next, if the access time period proceeds at a rate of access slower than a desired rate of access, the link access is terminated in the active mode of the Web browser and continues thereafter in a background mode on a scheduled or opportunistic basis, in response to a subsequent user input.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF PREFERRED EMBODIMENT

Figure 1:
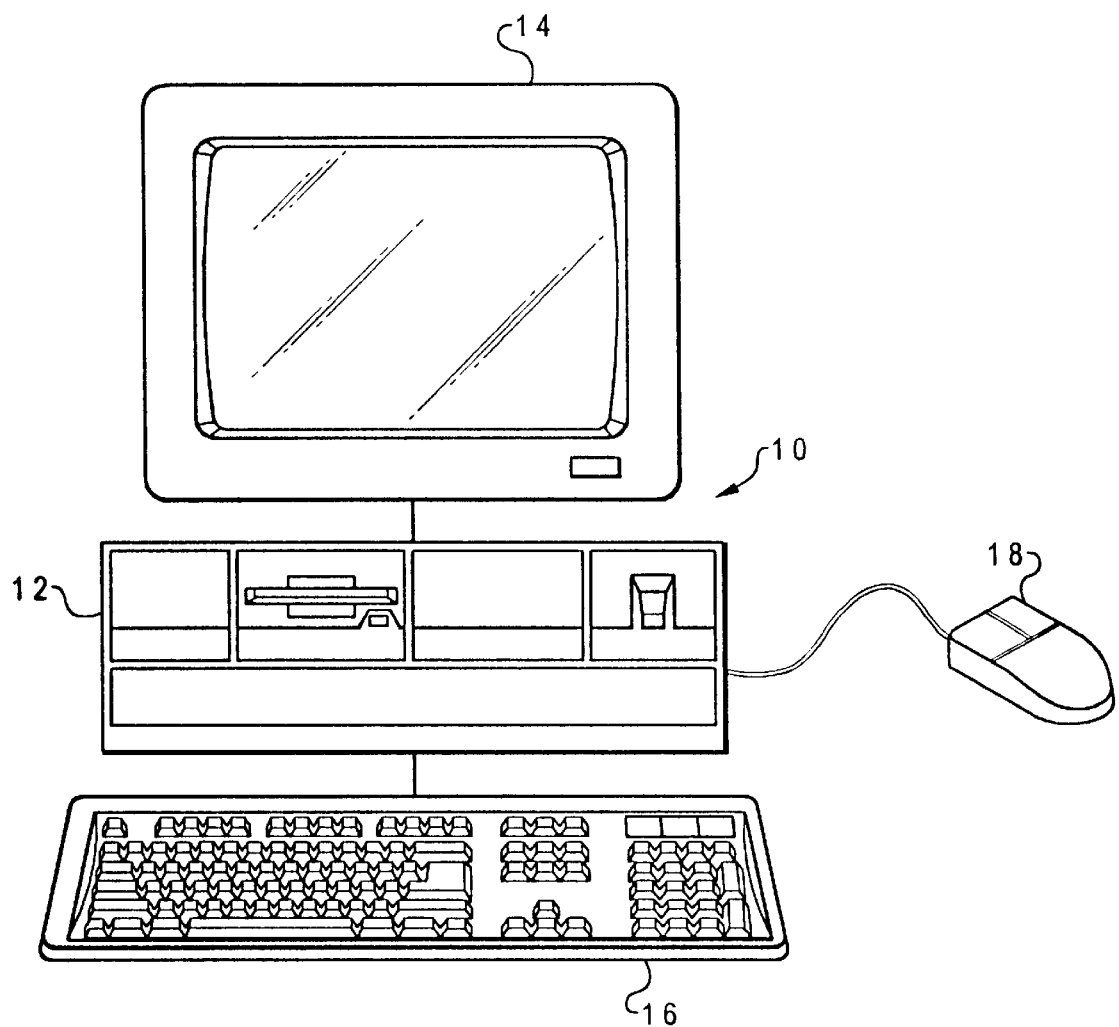
FIG. 1 is a pictorial representation of a data-processing system which can be implemented in accordance with the method and system of the present invention.

With reference now to the figures and in particular with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown) such as a trackball or stylus can also be included with personal computer 10. Personal computer 10 can be implemented utilizing any suitable computer such as an IBM Aptiva™ computer, a product of International Business Machines Corporation, located in Armonk, N.Y. "Aptiva" is a registered trademark of International Business Machines Corporation. Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10.

Figure 2:
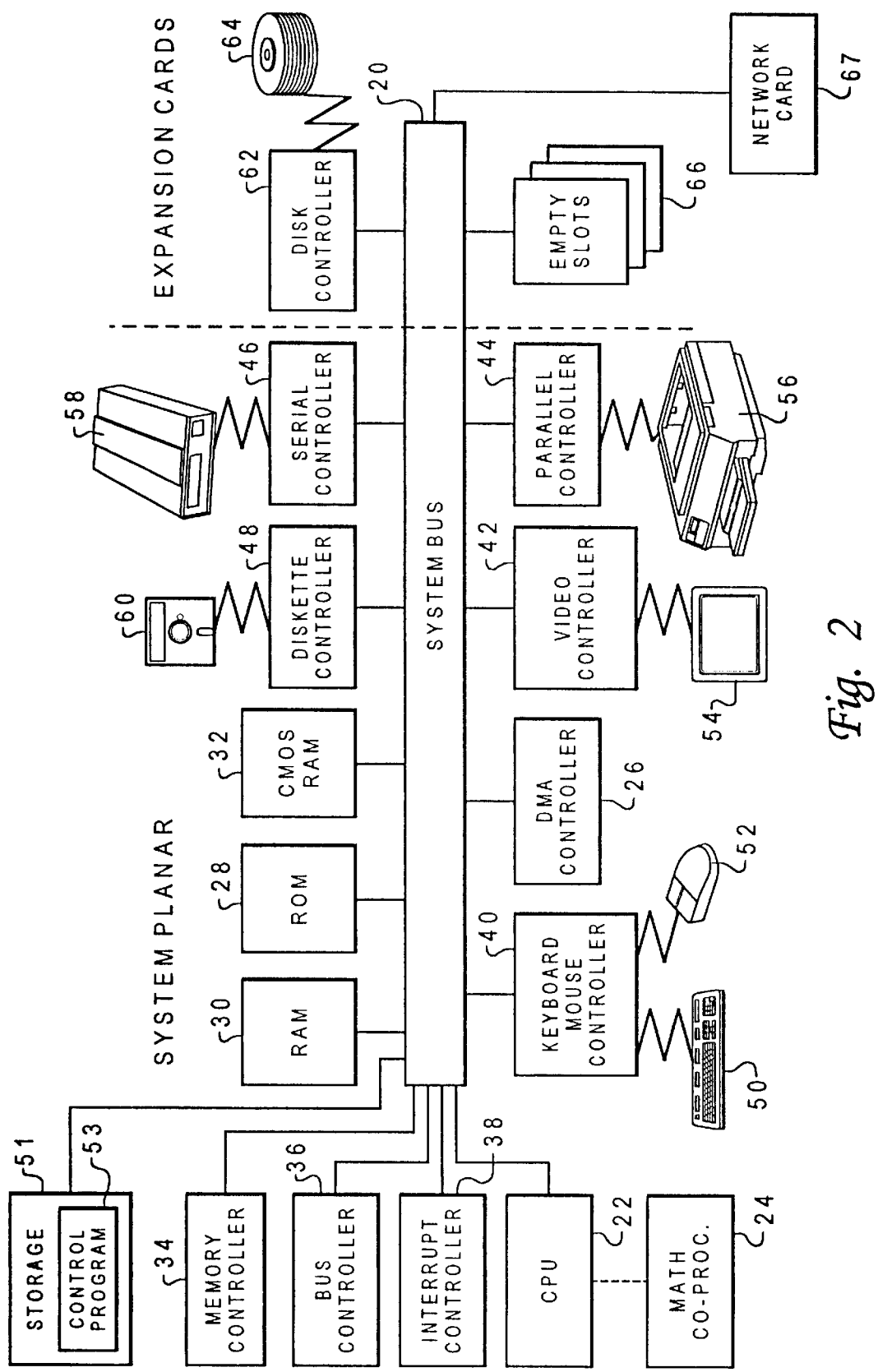
FIG. 2 depicts a block diagram illustrative of selected components in a personal computer system which can be utilized in accordance with the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor, such as central processing unit (CPU) 22, is connected to system bus 20 and also may have numeric coprocessor 24 connected to it. Direct memory access (DMA) controller 26 is also connected to system bus 20 and allows various devices to appropriate cycles from CPU 22 during large input/output (I/O) transfers. Read-only memory (ROM) 28 and random-access memory (RAM) 30 are also connected to system bus 20. RAM 30 can support a number of Internet-access tools, including, for example, an HTTP-compliant Web browser. ROM 28 is mapped into the CPU 22 address space in the range from 640K to 1 megabyte. CMOS RAM 32 is attached to system bus 20 and contains system-configuration information. Any suitable machine-readable media may retain the graphical-user interface of computer 10 of FIG. 1, such as RAM 30, ROM 28, a magnetic diskette, magnetic tape, or optical disk. Other technologies can also be utilized in conjunction with CPU 22, such as touch-screen technology or human voice control. In addition, computer 10 includes a control program 53 which resides within computer storage 51. Control program 53 contains instructions that when executed on CPU 22 carries out the operations depicted in the logic flow chart of FIG. 6 described herein.

Those skilled in the art will appreciate that the hardware depicted in FIG. 2 may vary for specific applications. For example, other peripheral devices such as optical-disk media, audio adapters, or chip-programming devices, such as PAL or EPROM programming devices well-known in the art of computer hardware, and the like may be utilized in addition to or in place of the hardware already depicted. In the example depicted in FIG. 2, a computer program product (i.e., control program 53) can reside in computer storage 51. However, it is important that, while the present invention has been and will continue to be described in a context of a fully functional computer system, those skilled in the art will appreciate that the graphical-user interface of the present invention is capable of being distributed as a computer program product via floppy disk, CD ROM, or other form of recordable media or via any type of signal-bearing media or electronic transmission mechanism, such as a modem.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers such as those depicted in FIG. 2: keyboard and mouse controller 40, video controller, 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices such as printer 56. Serial controller 46 provides a hardware interface for devices such as a modem 58. Diskette controller 48 provides a hardware interface for floppy disk unit 60.

Expansion cards also may be added to system bus 20, such as disk controller 62, which provides a hardware interface for hard disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client/server architecture, or to groups of computers and associated devices which are connected by communications facilities. Those skilled in the art will appreciate that the hardware depicted in FIG. 2 may vary for specific applications. For example, other peripheral devices such as optical disk media, audio adapters, or chip-programming devices such as a PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Figure 3:
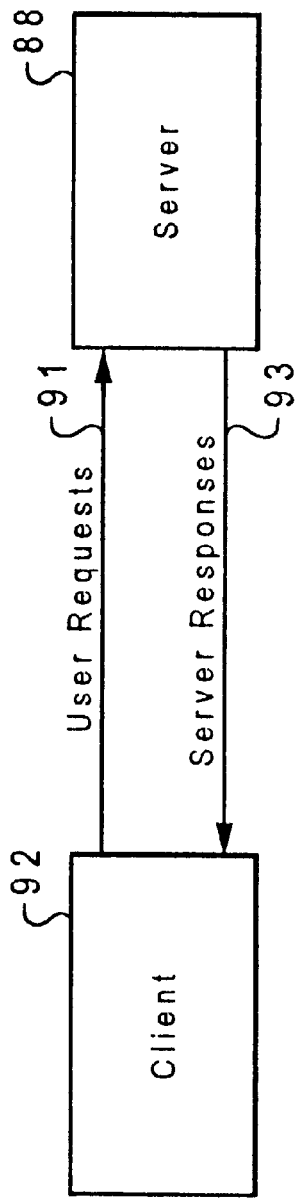
FIG. 3 illustrates a block diagram illustrative of a client/server architecture which can be utilized in accordance with the method and system of the present invention.

FIG. 3 illustrates a block diagram illustrative of a client/server architecture which can be utilized in accordance with the method and system of the present invention. In FIG. 3, user requests 91 for news are sent by a client application program 92 to a server 88. Server 88 can be a remote computer system accessible over the Internet or other communications medium. Client application program 92 may be utilized with computer 10 of FIG. 1 and the implementation of computer 10 illustrated in FIG. 2. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system, and communicate with one another over a communications medium, thus providing distributed functionality and allowing multiple clients to take advantage of the information-gathering capabilities of the server.

Figure 4:
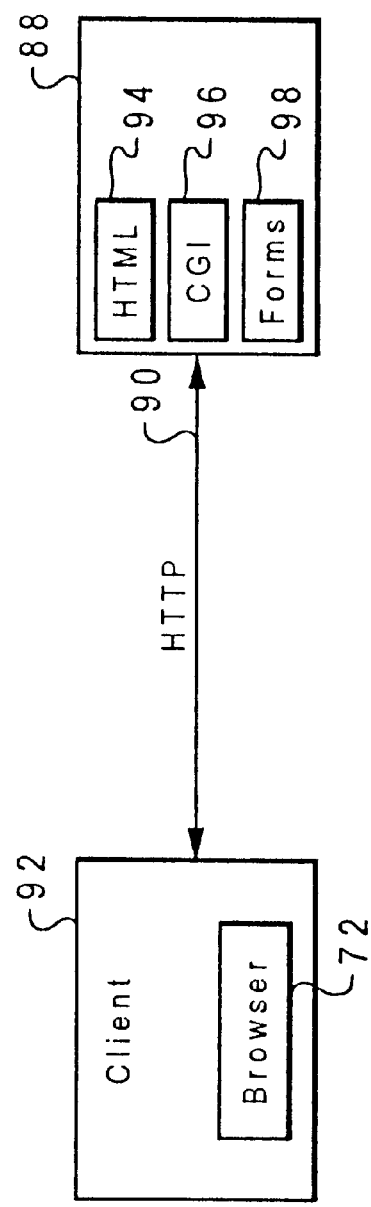
FIG. 4 depicts a detailed block diagram illustrative of a client/server architecture which can be utilized in accordance with the method and system of the present invention.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated.

Client 92 and server 88 communicate using the functionality provided by Hypertext Transfer Protocol (HTTP). The WWW or the "web" includes all the servers adhering to this standard which are accessible to clients via universal resource locators. Active within client 92 is a first process, browser 72, which establishes the connections with server 88, and presents information to the user. Any number of commercially or publicly available browsers may be used, in various implementations, such as the Mosaic-brand browser available from the National Center for Supercomputing Applications (NCSA) in Urbana-Champaign, Ill. Other browsers, such as Netscape™, provide the functionality specified under HTTP and the Mosaic browser can be utilized with the present invention. "Netscape" is a trademark of Netscape, Inc.

Server 88 executes the corresponding server software which presents information to the client in the form of HTTP responses 90. The HTTP responses 90 correspond with the Web "pages" represented using Hypertext Markup Language (HTML), or other data which is generated by the server. For example, under the Mosaic brand browser, in addition to HTML functionality 94 provided by server 88 (i.e., display and retrieval of certain textual and other data based upon hypertext views and selection of item(s)), a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion.

Figure 5:
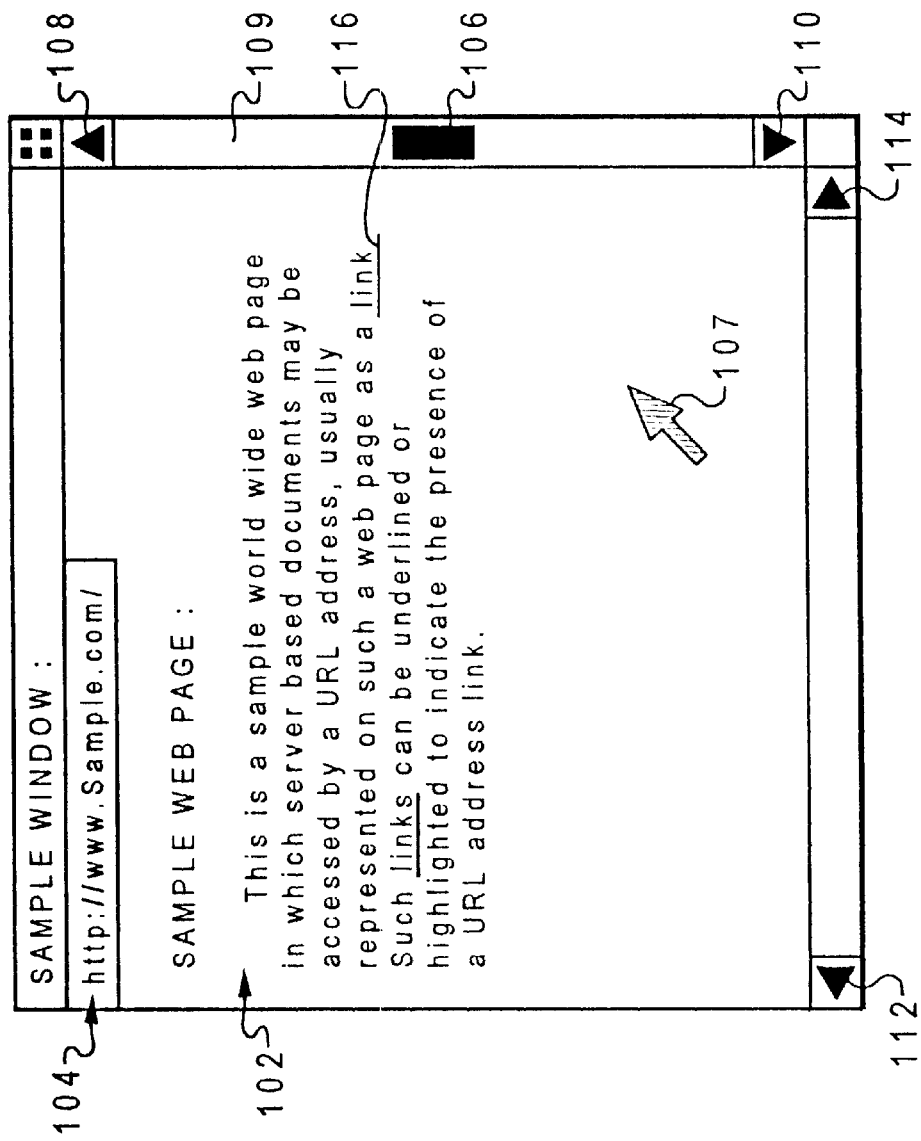
FIG. 5 illustrates a graphical user interface window in which a sample Web page is displayed in accordance with the method and system of the present invention.

FIG. 5 illustrates a graphical user interface window 100 in which a sample World Wide Web page 102 is displayed in accordance with the method and system of the present invention. A graphical user interface is a type of display format that enables a user to choose commands, start programs, and see lists of files and other options by pointing to pictorial representations (i.e., icons) and lists of menu items on the screen. Choices can generally be activated by either a keyboard or a mouse. The size and position of elevator 106 within scroll bar 109 corresponds to the size and position of the current viewable page in relation to the document displayed within window 100.

In the example window depicted in FIG. 5, because sample Web page 102 includes too many pages to view simultaneously, the user can position a mouse cursor over arrow section 108 or arrow section 110 of scroll bar 109 and click a pointing device (e.g., a mouse) to scroll the document upward or downward, as appropriate. Scrolling in this manner permits viewing of any desired portion of the document. Scrolling is the electronic equivalent of reading through a rolled (i.e., "scrolled") document rather than flipping through pages of a book. Arrow section 112 and 114 allow a user to scroll respectively left or right.

Window 100 includes an area dedicated to a universal resource locator (URL) address. A Web browser utilized by the graphical user interface searches specific address links. Internet services are typically accessed by specifying a unique address, or URL. The URL has two basic components, the protocol to be used, and the object pathname. For example, the URL "http://www.uspto.gov" (i.e., home page for the U.S. Patent and Trademark Office) specifies a hypertext transfer protocol (http) and a pathname of the server (www.uspto.gov). The server name is associated with a unique numeric value (TCP/IP address). In the example depicted in FIG. 1, sample Web page 102 is referred to by the URL "http://www.sample.com" (home page for the Sample Web Page). Sample Web page 102 includes links 116 which are typically underlined or highlighted to indicate the presence of a URL address link. If a Web browser user desires to go to the linked page, the user simply places cursor pointer 107 with a mouse or other pointing device over link 116 and activates the pointing device to access the linked page or document.

Hypertext Markup Language uses so-called "tags," generally delimited by the <> symbols, with the actual tag between the brackets. Most tags have a beginning (<tag>) and an ending section, with the end shown by the slash symbol (</tag>). There are numerous link tags in HTML to enable the viewer of the document to jump to another place in the same document, to jump to the top of another document, to jump to a specific place in another document, or to create and jump to a remote link (i.e., via a new URL) to another server. Links are typically displayed on a Web page in color or with an underscore. In response to the user pointing and clicking on the link, the link is said to be "activated" to begin the download of the linked document or text.

Figure 6:
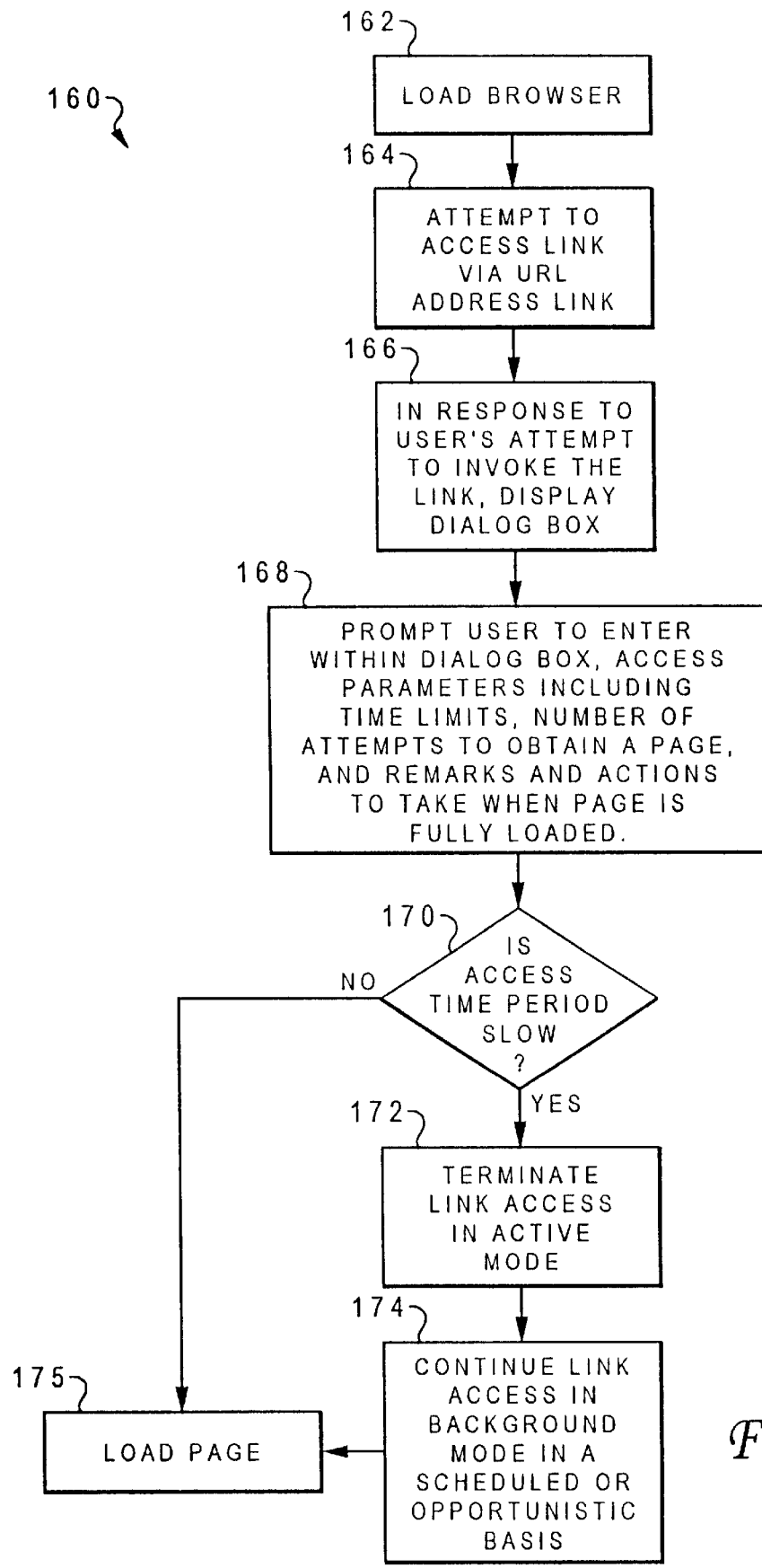
FIG. 6 depicts a high-level logic diagram illustrative of a Web browser extension method for backgrounding a link access during slow link access time periods in accordance with the method and system of the present invention.

FIG. 6 depicts a high-level logic diagram 160 illustrative of a Web browser extension method for backgrounding a link access during slow link access time periods in accordance with the method and system of the present invention. The method depicted in FIG. 6 permits a user to "background" a link access when such an access is proceeding or is anticipated by the user to proceed slowly. Instead of halting a slow response access, the user of the Web browser chooses to background the request. When the new page is eventually satisfied, the browser displays the page in a new window, informing the user that the page is now available. The backgrounded and newly available but previously backgrounded accesses can be managed through an additional dialog box. This additional dialog box is brought up from the browser, permitting a user to specify, within the window, parameters for a given URL address search. For example, the dialog box can contain icons which allow a user to enter parameters specifying time limits on attempts to obtain the page via the given link, remarks on the page, and action to take when the page is fully loaded.

As illustrated at block 162, a Web browser is initially loaded into a working directory of a data-processing system. As described at block 164, in response to user input, a user attempts to access a URL address link to a Web page by placing a cursor pointer over a URL address link and clicking a mouse or other pointing device. Alternatively, the user can manually type the URL address for utilization by the Web browser application. As illustrated at block 166, in response to the user's attempt to invoke the link, a dialog box is displayed. The dialog box is essentially a secondary window of a graphical-user interface having an original or primary window running in an active mode of the Web browser. Such a dialog box or secondary window is used to supplement the interaction in the primary window it is dependent on.

The displayed dialog box is associated with the URL chosen previously, as depicted at block 164. The dialog box displayed within the browser mode is displayed in an active mode (i.e., the present visual mode in which the current window is displayed and running within a graphical-user interface within a data-processing system). The user is prompted, as indicated at block 168, to enter within the dialog box, access parameters. Such access parameters can include time limits, number of attempts to obtain a page, and remarks and actions to take when such a page is fully loaded following termination of a link access. Thereafter, as described at block 170, a question is asked whether the access time period is slow (i.e., proceeding at a rate slower than a desired user-access rate). If the access time period is slow, then as depicted at block 172, the current link access is terminated in the active mode. If the link-access time period is not slow, the page is loaded and the process described herein is terminated. Thereafter, as illustrated at block 174, the link access continues in a background mode on a scheduled or opportunistic basis. Based upon access parameters entered by the user into the aforementioned dialog box, the link access may, for example, terminate in the background mode after a given amount of time desired by the user. During the background mode, the link access runs in a background window. The page is loaded into the background window. The active mode continues to run in an original window, allowing the user to perform multiple link accesses.

In addition, an override or forced background graphical user interface key or icon can be utilized with the present invention which allows a user to background a link access on command, regardless of whether or not data has been entered by the user into the aforementioned dialog box specifying limits on a particular link access. Such an operation can be performed utilized keyboard keys (i.e., function keys) or with a simple graphical user interface icon. A mouse can also be utilized to initiate such a forced backgrounding action. For example, in a data-processing system application which implements the present invention, mouse keys such as a second or third "unused" mouse key can be dedicated to perform or force background functions. In such a case, the user merely clicks the second or third mouse button and forces a link access immediately into a default background mode, without the need for entering information into the aforementioned dialog box.

Although the invention has been described in terms of a preferred embodiment, those skilled in the art will recognize that various modifications of the invention can be practiced within the spirit and scope of the appended claims. Thus, for example, the information supplied to a user of the Web browser method and system of the present invention during the period between link activation and downloading of the hypertext document need not be merely a visual output. It is also envisioned that some or all parts of a particular message be conveyed to the user aurally (via a multimedia speaker set, for example) as well as on the display screen itself. The message itself can be retained on the screen as an inline image or other text along with the downloaded hypertext document, and the browser includes appropriate means to queue the message to print and/or save the message or allow the user to compose a response to the message.

Moreover, although in the preferred embodiment it is envisioned that the hypertext document (associated with the Web page link) is located on a remote server, this is not a limitation of the invention. The display of informational messages may be effected whenever a link is activated, regardless of the location of the target document. Also, while the preferred embodiment has been described in the context of an internet browser, the techniques of the invention apply whether or not the user accesses the World Wide Web via a direct Internet connection (i.e., namely utilizing an Internet access provider) or indirectly through some on-line service provider (i.e., such as America-On-Line, Prodigy, Compuserve, the Microsoft Network, or the like). Thus, the "computer network" in which the invention is implemented should be broadly construed to include any client-server model from which a client can link to a "remote" document, even if that particular document is available on the same machine or system.

The present invention is adapted for use with the Internet's World Wide Web, but it is generally applicable to any network which provides files or "pages" having links that allow retrieval of other pages. While the invention has been particularly shown as described with reference to a preferred embodiment, it will be understood by those skilled in the art that various changes in form and detail may be made therein without departing from the spirit and scope of the invention.

What is claimed is:

1. A browser background extension method for a Web browser wherein a link access can be backgrounded during slow link access time periods in a computer network having at least one client connectable to one or more servers, said client having an interface for displaying a first hypertext document with at least one hypertext link to a second hypertext document located at a server, comprising the steps of:

associating at least one access parameter with said at least one hypertext link by displaying a dialog box including access parameters which may be modified by a user and prompting a user to enter access parameters which include at least one time parameter which specifies time limits on an attempt to obtain said second hypertext document;

selecting said at least one hypertext link to said second hypertext document in response to user input;

invoking an access time period in an active mode of a Web browser wherein said at least one hypertext link accesses said second hypertext document in response to said selection; and terminating said link access in said active mode and continuing said link access thereafter in a background mode on a scheduled or opportunistic basis, in response to a subsequent user input, if said access time period proceeds at a rate of access slower than a desired rate of access.

2. The method of claim 1 wherein the step of terminating said link access in said active mode and continuing said link access thereafter in a background mode on a scheduled or opportunistic basis, in response to a subsequent user input, if said access time period proceeds at a rate of access slower than a desired rate of access, further comprises the step of:

terminating said link access in said active mode and continuing said link access thereafter in a background window displayed within a graphical user interface within said client in a background mode on a scheduled or opportunistic basis, in response to a subsequent user input, if said access time period proceeds at a rate of access slower than a desired rate of access.

3. The method of claim 2 further comprising the steps of:

prompting a user to enter within said dialog box, access parameters wherein said access parameters include:
      at least one remarks parameter indicating user remarks about said second hypertext document; and
      at least one user action parameter indicating action to take when said second hypertext document if fully loaded to said client from said at least one server following a completion of said access time period.

4. A browser background extension system for a Web browser wherein a link access can be backgrounded during slow link access time periods in a computer network having at least one client connectable to one or more servers, said client having an interface for displaying a first hypertext document with at least one hypertext link to a second hypertext document located at a server, comprising:

association means for associating at least one access parameter with said at least one hypertext link by displaying a dialog box including access parameters which may be modified by a user and prompting a user to enter access parameters which include at least one time parameter which specifies time limits on an attempt to obtain said second hypertext document;

selection means for selecting said at least one hypertext link to said second hypertext document in response to user input;

access time period means for invoking an access time period in an active mode of a Web browser wherein said at least one hypertext link accesses said second hypertext document in response to said selection; and background means for terminating said link access in said active mode and continuing said link access thereafter in a background mode on a scheduled or opportunistic basis, in response to a subsequent user input, if said access time period proceeds at a rate of access slower than a desired rate of access.

5. The system of claim 4 wherein said background means for terminating said link access in said active mode and continuing said link access thereafter in a background mode on a scheduled or opportunistic basis, in response to a subsequent user input, if said access time period proceeds at a rate of access slower than a desired rate of access, further comprises:

background means for terminating said link access in said active mode and continuing said link access thereafter in a background window displayed within a graphical user interface within said client in a background mode on a scheduled or opportunistic basis, in response to a subsequent user input, if said access time period proceeds at a rate of access slower than a desired rate of access.

6. The system of claim 5 further comprising:

prompting means for prompting a user to enter within said dialog box, access parameters wherein said access parameters include:
  at least one remarks parameter indicating user remarks about said second hypertext document; and
  at least one user action parameter indicating action to take when said second hypertext document if fully loaded to said client from said at least one server following a completion of said access time period.

7. A computer program product residing in computer memory in a data-processing system for permitting a Web browser background extension for a Web browser for a link access during slow link access time periods in a computer network having at least one client connectable to one or more servers, said client having an interface for displaying a first hypertext document with at least one hypertext link to a second hypertext document located at a server, comprising:

association means for associating at least one access parameter with said at least one hypertext link by displaying a dialog box including access parameters which may be modified by a user and prompting a user to enter access parameters which include at least one time parameter which specifies time limits on an attempt to obtain said second hypertext document;

selection means for selecting said at least one hypertext link to said second hypertext document in response to user input;

access time period means for invoking an access time period in an active mode of said Web browser wherein said at least one hypertext link accesses said second hypertext document in response to said selection;

background means for terminating said link access in said active mode and continuing said link access thereafter in a background mode on a scheduled or opportunistic basis, in response to a subsequent user input, if said access time period proceeds at a rate of access slower than a desired rate of access; and first signal-bearing means bearing said association means, said selection means, said access time period means, and said background means.

8. The computer program product of claim 7 wherein said background means for terminating said link access in said active mode and continuing said link access thereafter in a background mode on a scheduled or opportunistic basis, in response to a subsequent user input, if said access time period proceeds at a rate of access slower than a desired rate of access, further comprises:

background means for terminating said link access in said active mode and continuing said link access thereafter in a background window displayed within a graphical user interface within said client in a background mode on a scheduled or opportunistic basis, in response to a subsequent user input, if said access time period proceeds at a rate of access slower than a desired rate of access.

9. The computer program product of claim 8 further comprising:

prompting means for prompting a user to enter within said dialog box, access parameters wherein said access parameters include:
  at least one remarks parameter indicating user remarks about said second hypertext document;
  at least one user action parameter indicating action to take when said second hypertext document if fully loaded to said client from said at least one server following a completion of said access time period; and
  second signal-bearing means bearing said dialog box display means and said prompting means.

10. The computer program product of claim 9 wherein:
said first signal-bearing means further comprises recordable media; and
said second signal-bearing means further comprises recordable media.

11. The computer program product of claim 9 wherein:
said first signal-bearing means further comprises transmission media; and
said second signal-bearing means further comprises transmission media.

* * * * *